United States Patent [19]
Way et al.

[11] Patent Number: 5,954,462
[45] Date of Patent: Sep. 21, 1999

[54] SPOT FACING MACHINE

[75] Inventors: Arlan W. Way, Gladstone, Oreg.; Terence M. McCarver, Sarnia, Canada

[73] Assignee: Climax Portable Machine Tools, Inc., Newberg, Oreg.

[21] Appl. No.: 09/133,044

[22] Filed: Aug. 12, 1998

[51] Int. Cl.[6] .................................................. B23C 9/00
[52] U.S. Cl. .................. 408/153; 82/113; 408/80
[58] Field of Search .................. 408/80, 81, 82, 408/153; 82/1.2, 113, 128

[56] References Cited

U.S. PATENT DOCUMENTS

| | | |
|---|---|---|
| 180,169 | 7/1876 | Tasker . |
| 2,004,741 | 6/1935 | Zimmerman . |
| 2,749,809 | 6/1956 | Anderson ................................. 408/80 |
| 2,750,196 | 6/1956 | Peczynski . |
| 4,149,436 | 4/1979 | Blattler . |
| 4,257,289 | 3/1981 | Groothius ................................. 82/113 |
| 4,281,947 | 8/1981 | Marlowe . |
| 4,285,528 | 8/1981 | Neamtu . |
| 4,411,178 | 10/1983 | Wachs et al. . |
| 4,434,689 | 3/1984 | Nall et al. ................................. 82/113 |
| 4,483,223 | 11/1984 | Nall et al. . |
| 4,621,548 | 11/1986 | Kubo et al. . |
| 4,637,285 | 1/1987 | Mizoguchi . |
| 4,655,106 | 4/1987 | Munn . |
| 4,677,884 | 7/1987 | Kwech et al. . |
| 4,753,143 | 6/1988 | Mynhier . |
| 4,852,435 | 8/1989 | Hunt . |
| 4,950,109 | 8/1990 | Dettinger ................................. 408/82 |
| 5,125,299 | 6/1992 | Strait . |
| 5,361,659 | 11/1994 | Hanson ................................. 82/113 |

*Primary Examiner*—Andrea L. Pitts
*Assistant Examiner*—Adesh Bhargava
*Attorney, Agent, or Firm*—Dellett and Walters

[57] ABSTRACT

A spot facing mechanism employs a self centering chuck, a stationary mandrel and housing. Axial feed controls are also stationary when the apparatus is operational. Incremental radial feeding of the tool head is provided, with the degree of feed being adjustable between zero feed and maximum feed. Radial feed rate adjustment controls remain stationary while the apparatus is operating, enabling adjustment of feed rate without having to stop the machine.

19 Claims, 3 Drawing Sheets

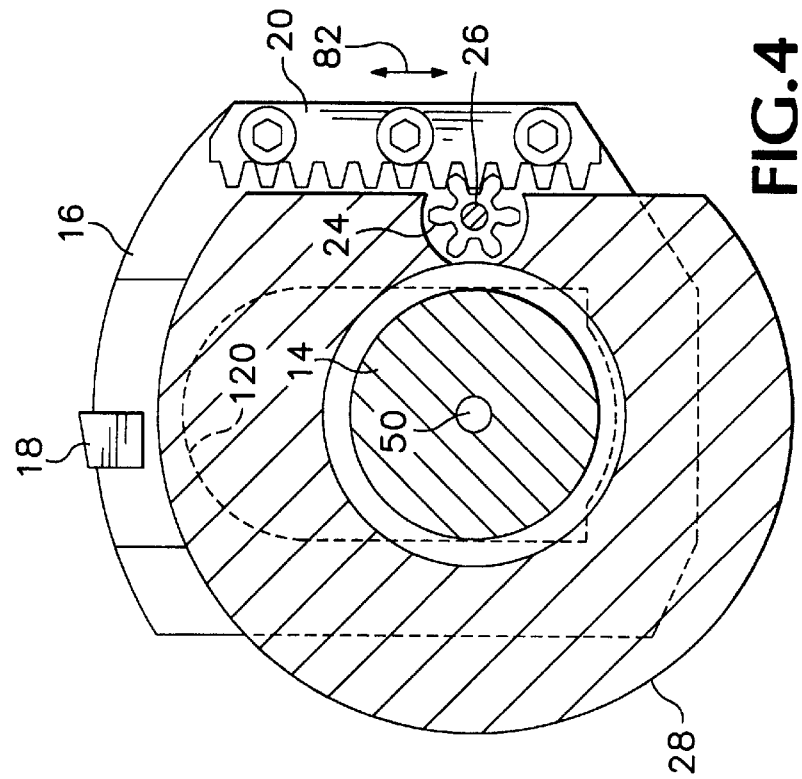
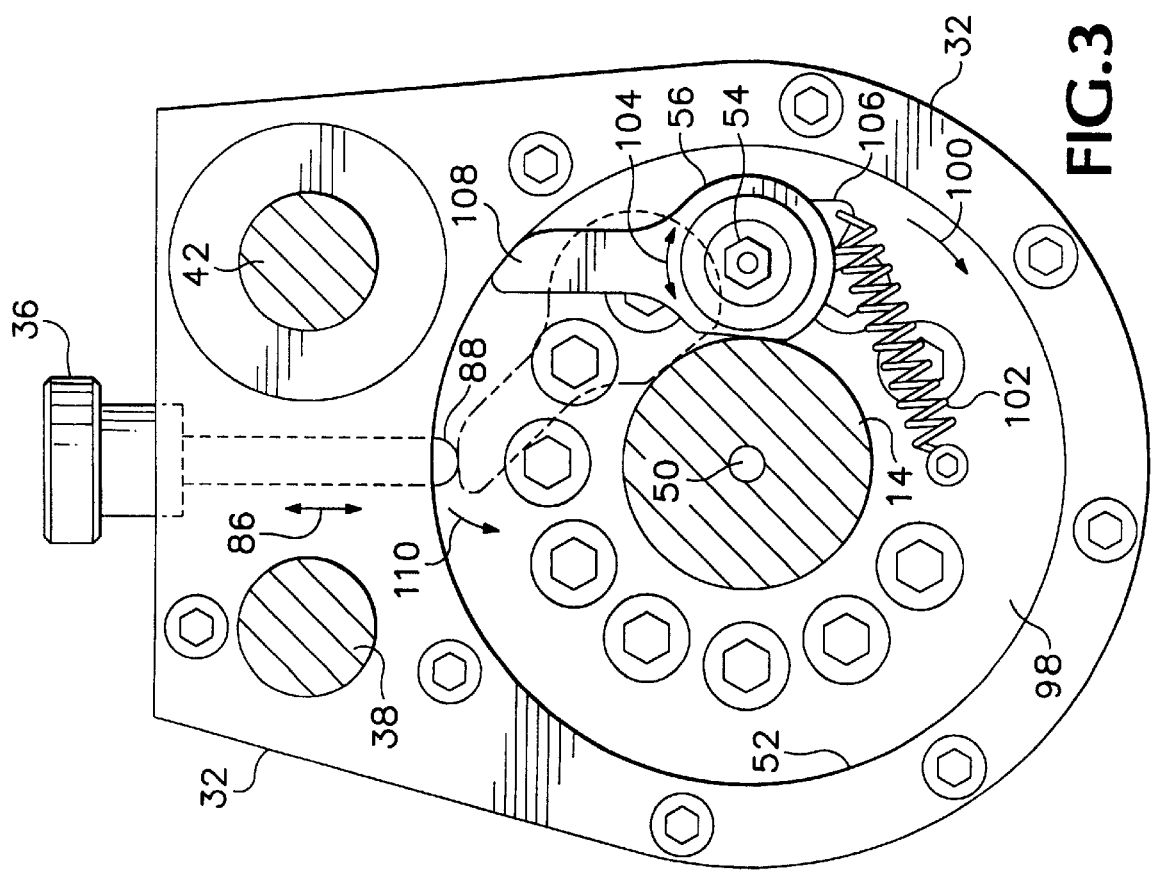

SPOT FACING MACHINE

This invention relates to machine tools, and more particularly to an improved spot facing machine for use in applications with minimal clearance.

BACKGROUND OF THE INVENTION

In turbine couplings, a pair of large diameter rings are coupled together by bolts that pass through apertures in the middle of the ring web. A counter sunk through hole is provided on each of the "external" faces of the respective rings, for receiving a bolt therethrough. A series of such through holes are provided spaced at regular intervals about the ring, to provide a bolt circle all the way around the coupling. Typical bolt diameters are in the range of 2 to 3¾ inches, for example. The counter bores around the holes are typically between 4 and 8 inches in diameter, and are adapted to receive a round nut to attach to the bolt. The nut is tightened to tension the bolt stud through the middle of the through hole. As the nuts are tightened around the circumference of the coupling, sometimes a chip or burr is pulled on the face of the counter bore against which the nut rests. On later dis-assembly and prior to subsequent re-assembly of the coupling, it is desired to reclaim that surface by removing the chip before re-installing the round nuts (or whatever kind of bolt/nut combinations are being used).

Accordingly, it is desirable to be able to "face" the seat portion of the counter bore, in order to provide a smooth surface for the nut to engage with on re-assembly. However, given the relatively deeply recessed location of the seat portion, heretofore it was difficult if not impossible to fit existing facing machines into the opening. Still further, the only reference surface that is available to ensure perpendicular alignment of the facing apparatus is the bore within the bolt hole. The facing machine must be properly aligned within the opening, to ensure a square facing operation. If the apparatus is mis-aligned, then the faced portion will be at an angle, which will result in an improper fit with the nut and bolt, which can cause undesired stresses on the fasteners.

SUMMARY OF THE INVENTION

In accordance with the invention, a spot facing apparatus is provided that includes a chucking portion for engagement with the sidewalls of a bore. A stationary mandrel and body are provided, with a stationary feed control. Inner portions of the apparatus rotate, suitably under air power, to rotate a cutting tool which suitably faces the desired surface. An advancement mechanism provides and adjustable amount of radial feed to the cutting tool, to enable facing of a surface across a desired radius thereof.

Accordingly, it is an object of the present invention to provide an improved facing apparatus that is self-aligning relative to a facing surface.

It is a further object of the present invention to provide an improved facing apparatus that employs a stationary mandrel.

It is yet another object of the present invention to provide an improved facing machine with a stationary body.

A further object of the present invention is to provide an improved facing apparatus with a stationary feed control.

Yet another object of the present invention is to provide facing of recessed counter bore surfaces that are difficult to reach with conventional facing apparatus.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 3 is a sectional view of the facing apparatus of FIG. 1, taken along line B—B;

FIG. 4 is a sectional view of the facing apparatus of FIG. 1, taken along line C—C.

DETAILED DESCRIPTION

Figure 1:
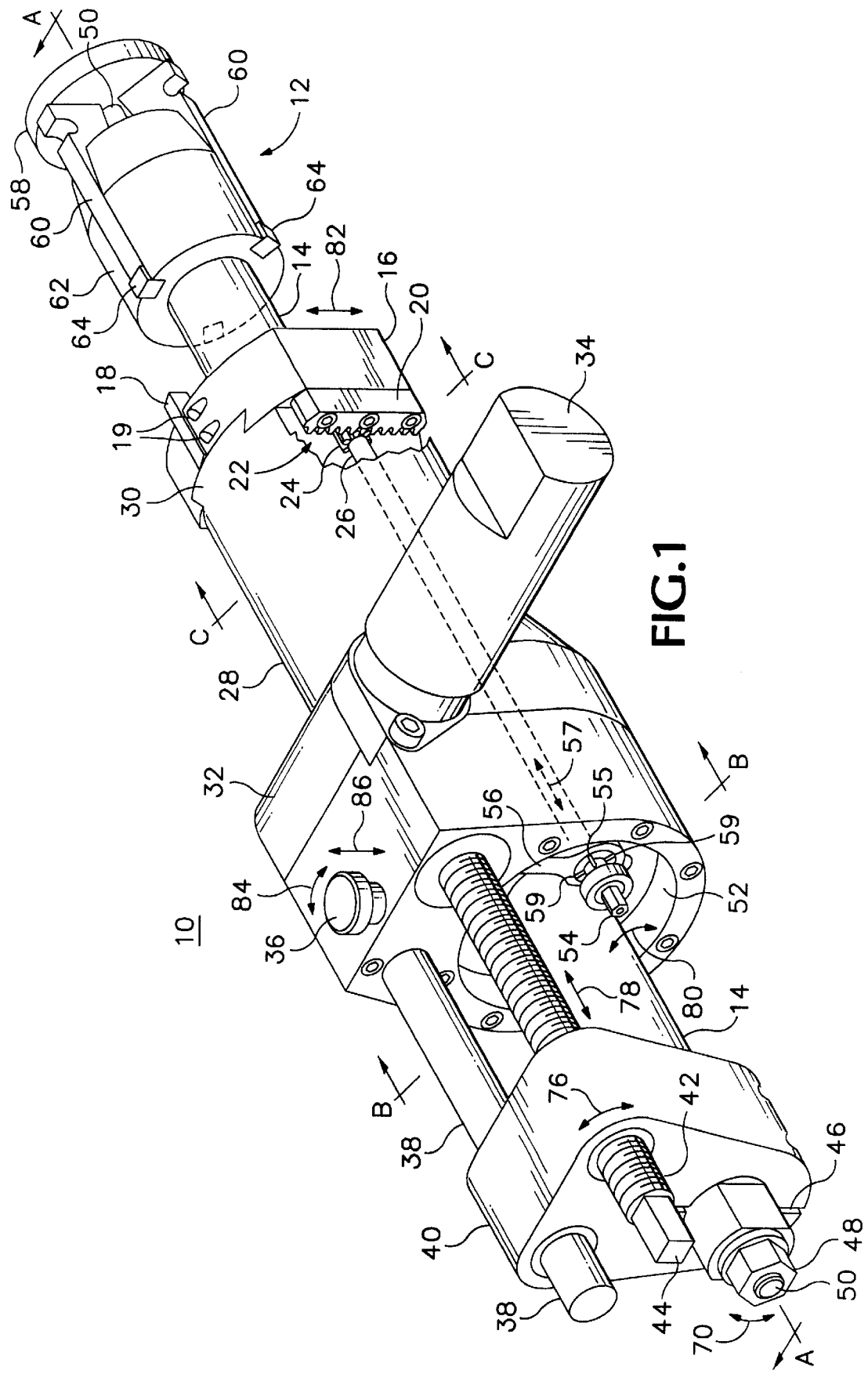
FIG. 1 is a perspective view of a spot facing apparatus according to the present invention, with portions thereof broken away.

Referring to FIG. 1, a perspective view of a spot facing apparatus according to the present invention, the facing apparatus 10 comprises self centering chuck portion 12 which is attached to a stationary mounting mandrel 14. Mandrel 14 extends longitudinally away from the chuck, through the center of the rest of the mechanism of the apparatus. A tool head 16 secures tool 18, while allowing removal and replacement of the tool as necessary. The tool 18 is held to the head by fasteners 19. On a side portion of tool head 16, feed rack 20 is mounted, with inwardly facing rack teeth portion 22, observable in the cut away portion of the apparatus in FIG. 1. The rack teeth engage with radial feed pinion 24, said pinion being carried on radial feed shaft 26. A spindle body portion 28 and stationary main drive housing 32 define the position of the tool head relative to the rest of the apparatus, and are adapted to translate along mandrel 14 as indicated by arrow 78, and as described further hereinbelow. Portion 28 carries a dovetail slide portion 30 at the forward end thereof. Tool head 16 has a mating portion that interacts with the dovetail slide 30. As may be observed in FIG. 1, radial feed shaft 26 extends (illustrated in phantom) through the body of the facing apparatus away from the direction of the chuck portion.

The spindle body portion 28 extends out of the stationary main drive housing 32, which has drive motor 34 mounted thereon. Motor 34 is suitably a pneumatic motor, but could be electric, or any other suitably powered drive system. At a top portion of the main housing is a radial feed rate adjusting member 36, which extends into the main housing and enables adjustment of the rate of feeding of the cutting tool head as described hereinbelow. An elongate torque restraining rod 38 extends out of the main housing 32 and is slidingly received by a torque restraint/axial feed box 40. The torque restraining rod 38 suitably extends a distance beyond box 40. Torque restraint/axial feed box 40 also receives an axial feed screw 42 therethrough, wherein the axial feed screw suitably extends to the main drive housing, while being free to rotate about its longitudinal axis. The feed screw is fixed to the main housing, but is allowed to rotate. The end of the feed screw 42 that is distal from the main housing carries a head 44 thereon, which enables rotational driving of the feed screw via engagement with a socket wrench or the like. The threaded engagement of the feed screw with the feed box 40 and its fixed engagement with the main housing allows translation of the main housing along the mandrel in response to rotation of the feed screw.

Mandrel 14 extends through and engages with torque restraint/axial feed box 40 at a split opening portion 46. The feed box 40 is suitably secured to mandrel 14 by tightening fasteners as discussed herein in connection with FIG. 2. A chuck clamping nut 48 is received at the end of a draw bolt 50, wherein the draw bolt is substantially contained within the interior of and is co-extensive with mandrel 14.

The face of the housing 32 that is distal from the mounting chuck has a counter bore portion 52 defined therein, centered about mandrel 14. Radial feed shaft 26 extends a distance beyond the feed body at this point, and carries a head 54 thereon to enable driven rotation of the feed shaft 26, via use of a socket or other such drive device. A radial feed ratchet drive arm 56 is mounted about shaft 26, as will be described in greater detail hereinbelow. In a preferred embodiment of the invention, head 54 and pinion 24 are formed as an integral part of shaft 26, although this is not a requirement.

Self centering chuck portion 12 comprises a face disk 58 which is in threaded engagement with draw bolt 50. Plural engagement members 60 are regularly spaced about a tapered chuck body 62, carrying engagement faces 64 at ends thereof distal from disk 58. In the preferred embodiment, three such engagement members are provided, spaced 120 degrees apart from each other.

Figure 2:
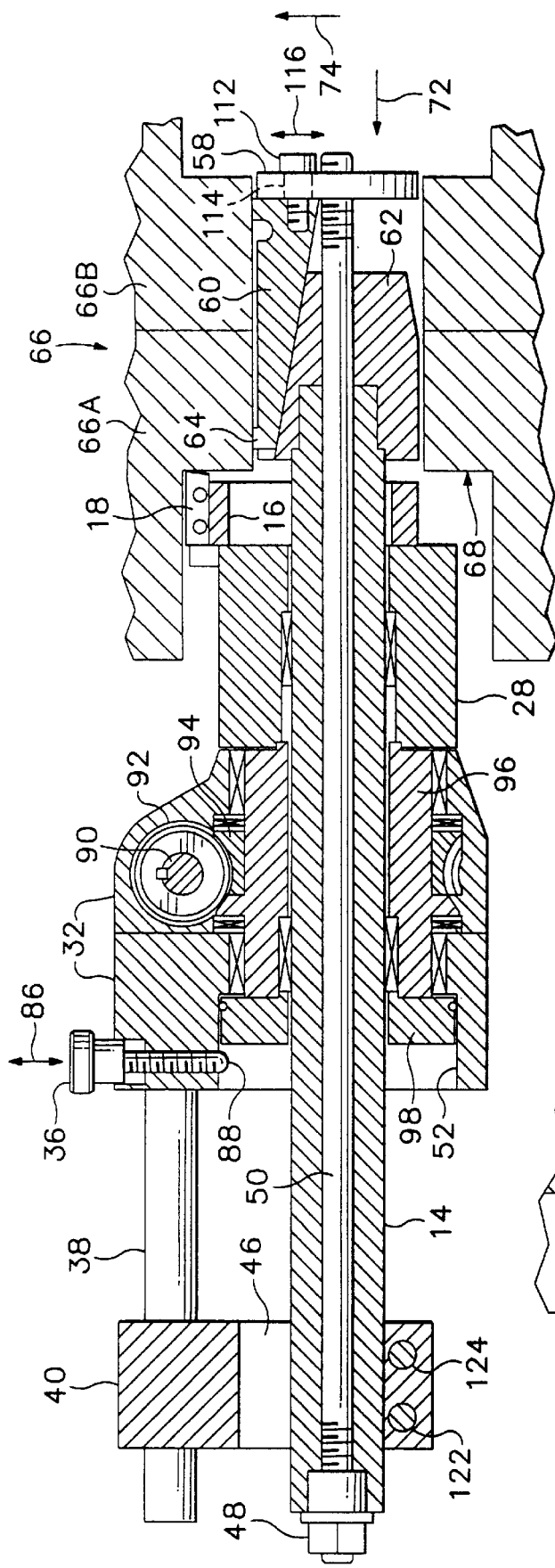
FIG. 2 is a sectional view of the facing apparatus of FIG. 1, taken along line A—A, with the apparatus installed in a typical operating environment.

Referring now to FIG. 2, a sectional view of the facing apparatus of FIG. 1, taken along line A—A, in an exemplary operating environment, turbine coupling 66 comprises a front portion 66A and a rear portion 66B. The seat portion 68 of the counter bore section of portion 66A defines the surface that is to be faced by the apparatus in accordance with the invention. To install the apparatus, the chuck portion 12 is inserted into the interior of the coupling bolt hole. Then, draw bolt nut 48 is rotated (see arc 70 in FIG. 1), which causes the axial translation of disk 58. Such axial translation pulls the disk 58 in the direction of arrow 72, pushing the engagement members 60 against the taper ramp portion of chuck body 62. The interaction of the members 60 with the ramped chuck body causes the engagement faces 64 of the members 60 to push radially outwardly in the direction of arrow 74 (for the particular engagement member 60 illustrated in FIG. 2), ultimately causing the engagement face 64 to push against the inner wall of the bolt hole bore. The engagement members 60 are held to the disk 58 via bolts 112, which threadably engage the members 60. Disk 58 has slots 114 defined therein, which allow the bolts 112 and members 60 to translate along line 116. The radial outward movement of members 60 is facilitated by the slot 114 in which the bolts 112 are able to translate. The simultaneous extension of the plural engagement faces results in a self-centering securement of the tool to the coupling. The engagement members 60 are suitably removable, and can be replaced with different sized engagement members, or members with different engagement face configurations, to enable adaptation to a variety of mounting requirements. Such removal is accomplished by loosening bolts 112.

As mentioned hereinabove, the feed box 40 is suitably secured to mandrel 14 by tightening fasteners 122, 124 which are threadably received in a lower portion of the feed box. The split opening portion 46 is urged toward a closed position as the fasteners 122, 124 are tightened, thereby clamping the mandrel within the feed box, for a secure engagement.

After the apparatus has been mounted within the coupling, then, referring to FIG. 1, the body of the tool and thereby the cutting tool head 16 can be moved inwardly to be close to or engage with the surface to be faced. Such movement is accomplished by rotation of the feed screw 42 by driving the head 44 with a wrench or the like. Rotation of the feed screw about arc 76 causes in the translation of the feed body along line 78, as a result of the threaded engagement of the feed screw to torque box 40 and the fixed engagement of mandrel 14 to box 40. The feed screw is rotated to move the cutting head inwardly, depending upon the amount of material that is desired to be removed from the seat. Main housing 32, spindle body portion 28 and 96 are slideable along the mandrel 14, to allow translation therealong.

Still referring to FIG. 1, it will be noted that rotation of shaft 26, as indicated by arc 80, will also cause rotation of pinion 24, whereby the engagement between the pinion and feed rack 20 will cause translation of the feed rack inwardly or outwardly along line 82, as a result of the rack being secured to the tool holder as well as the dovetail slide relation of the tool holder to the spindle body portion 28. Such translation moves the facing head (or tool head) 16 inwardly or outwardly radially, which causes a wider or narrower cutting radius.

Referring to FIG. 1 together with FIG. 2, feed rate adjusting member 36 is threadably engaged with the feed body, and rotation of the member 36 as indicated by arc 84 (FIG. 1) will raise or lower member 36 along line 86. As member 36 is lowered, the bottom portion 88 thereof will project further into the void defined by counter bore 52. The utility of this arrangement will be discussed hereinbelow in conjunction with FIG. 3.

Referring still to FIG. 2, drive motor 34 (visible in FIG. 1) powers a shaft 90, which carries, for example, a rotational drive worm 92 thereon. The drive worm interacts with a worm gear 94, which is pinned to the spindle 96, and spindle 96 is secured to body portion 28, such that the body and spindle will rotate within the housing 32. A rotational plate 98 attaches to the spindle, and suitably fits within bore 52. A central aperture in the plate allows mandrel 14 to pass therethrough, while still enabling rotation of the plate relative to the mandrel and the housing 32.

Referring now to FIG. 3, a sectional view of the facing apparatus of FIG. 1, taken along line B—B, the incremental feeding structure and function will be further described. Radial feed ratchet drive arm 56 is mounted to radial feed shaft 26 (which is indicated by head 54 in FIG. 3) so as to be able to rotate about the longitudinal axis of shaft 26, as indicated by arc 104. A spring member 102 is fixed at one end to plate 98 and at the other end to an ear 106 of arm 56, suitably to bias the arm so that its distal end 108 is urged to engage with the inner wall of bore 52 when the drive motor is operated, plate 98, shaft 26 and, therefore, arm 56 all rotate about mandrel 14, suitably in the direction of arrow 100, while mandrel 14 and housing 32 remain stationary. As the plate rotates, the end portion 108 of the arm will ride around about the inner circumference of the bore, until such time as portion 108 comes into contact with the bottom portion 88 of adjusting member 36. The intrusion of member 36 into the area where arm portion 108 is riding, will cause the arm to rotate in the direction of arrow 110, toward the center of bore 52. Such rotation thereby drives shaft 26, whereby pinion 24 rotates, which causes rack portion 20 to translate, changing the position of the tool holder 16 (which slides on dovetail slide 30) and tool 18. By such arrangement, incremental feeding is accomplished. To increase the amount of feed effected with each rotation of the system, adjusting member 36 is rotated to extend further into bore 52, causing greater displacement of arm portion 108, and accordingly causing a greater amount of rotation of shaft 26. Conversely, to halt feeding altogether, member 36 is adjusted such that its tip 88 does not protrude at all into the bore 52. Thus, each time the arm passes the point where member 36 would have been protruding, there is no displacement of the arm portion 108, and accordingly there is no rotation of shaft 26. If shaft 26 does not rotate, pinion 24 does not rotate and therefore rack 20 does not translate.

Figure 5:
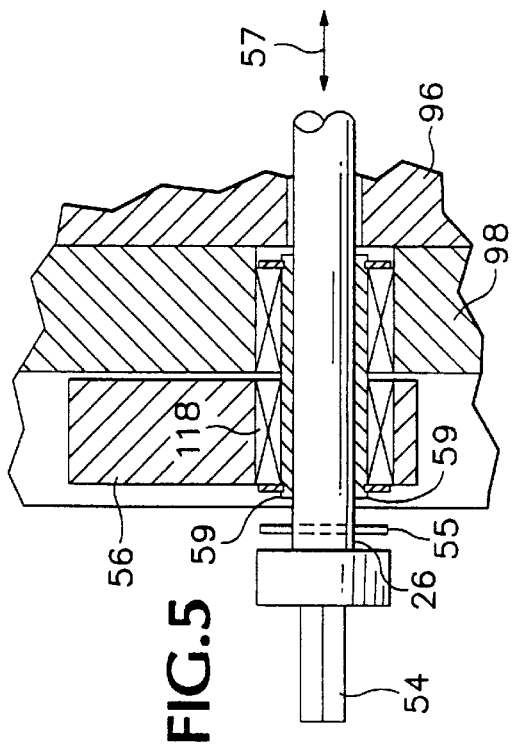
FIG. 5 is a partial sectional view of the radial feed arm and shaft incremental feed mechanism.

Referring now to FIG. 5, a partial sectional view of the arm and shaft incremental drive mechanism, a dowel pin 55 extends through shaft 26, with opposite ends of the dowel pin extending outwardly from the shaft a short distance. A series of 4 corresponding grooves 59 (also visible in FIG. 1) are formed in a front face of a clutch 118, equally spaced radially about the shaft 26, any 2 opposing of said grooves receiving the respective ends of pin 55 therein. Shaft 26 is suitably slideable along axis 57, to move the pin 55 alternately into and out of engagement with the grooves 59 as desired. Therefore, to allow rapid manual radial feeding adjustment of the tool, an operator slides shaft 26 outwardly, to disengage the pin 55 from grooves 59. Head 54 is engaged, for example by a manual drive, and is rotated to radially feed the tool inwardly or outwardly to a start position. Shaft 26 is then moved forwardly, which will result in pin 55 engaging with the grooves 59, to allow automatic feeding as the device operates. Pinion 24 is formed with sufficient length so as to still be in engagement with rack teeth 22 even though the shaft (and thus the pinion) have been moved rearwardly or forwardly a distance relative to the tool. Arm 56 engages with shaft 26 and pin 55 via one way clutch mechanism 118, wherein counter-clockwise rotation of the arm results in a corresponding counter-clockwise rotation of shaft 26 (when pin 55 is engaged with grooves 59). Conversely, clockwise rotation of the arm 56 (as urged by spring 102) does not cause a corresponding rotation of shaft 26. Therefore, shaft 26 will rotate to incrementally advance the feed rack and pinion system, but will not cause a retract feed in response to return rotation of the arm 56. Alternatively, the shaft 26 may be left in its rearwardly oriented position so that pin 55 is not engaging grooves 59, whereby automatic feeding does not occur, to allow manual radial feeding.

FIG. 4 is a sectional view of the facing apparatus of FIG. 1, taken along line C—C, illustrating the rack and pinion, as well as the tool head 16. Since the rack 20 is securely mounted to the tool head, as the pinion rotates, the tool head will translate up and down along line 82, moving on the dovetail slide 30. As noted above, in the preferred embodiment of the invention, incremental extension feeding of the cutting tool radially outwardly is accomplished with each rotation of the device, the degree of feed being a factor of how far tip 88 of member 36 is extending into bore 52. Retraction feed is suitably accomplished manually, by manual rotation of shaft 26 via a wrench or the like attached to head 54. Such manual retraction is employed to initially position the cutting head in a desired start position or to return it to the start position after a pass of the facing operation is completed. The tool head comprises a central opening 120, which allows the head to fit over mandrel 14 so as to be rotatable around the mandrel without interference.

Therefore, in accordance with the invention, an improved facing apparatus is provided that is able to face surfaces in tight clearance situations. The drive motor, feed adjustment controls, mandrel and main housing of the facer remain stationary during operation, while the inner portion of the apparatus is rotating. A variable feed rate adjustment is provided, so that the amount of radial feed applied to the tool bit can be varied from no feed up to a maximum feed distance. The chucking system allows the apparatus to be mounted and aligned properly relative to a bore, so that the faced surface is perpendicular to the bore.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. An apparatus for facing a workpiece comprising:
   a workpiece engager, for securing the apparatus relative to the workpiece;
   a rotary facing portion;
   a stationary body portion carrying said rotary facing portion;
   a power source for providing driving power to rotate said rotary facing portion;
   an incremental feed mechanism for providing incremental radial feeding of said rotary facing portion;
   a radial feed rate adjustment member for enabling adjustment of the amount of feeding provided by said incremental feed mechanism; and
   an axial feed for axially moving said rotary facing portion relative to the workpiece.

2. Apparatus according to claim 1 wherein said axial feed remains stationary relative to said rotary facing portion.

3. Apparatus according to claim 1 wherein said radial feed rate adjustment member remains stationary relative to said rotary facing portion.

4. Apparatus according to claim 1 wherein said rotary facing portion comprises a tool holder, said tool holder comprising a rack portion, wherein said incremental feed portion comprises a pinion for engaging with said rack portion, wherein said pinion rotates on a regular basis to incrementally move said rack relative thereto.

5. Apparatus according to claim 4 wherein said feed rate adjustment member comprises a pin member and said incremental feed portion further comprises an engagement arm coupled with said pinion, wherein said engagement arm regularly interacts with said pin member, whereby said engagement arm is displaced, said displacement resulting in rotation of said pinion.

6. Apparatus according to claim 5 wherein said engagement arm is coupled with said pinion via a clutch, whereby movement of said engagement arm in a first direction effects in rotation of said pinion, and whereby movement of said engagement arm in a second direction does not effect rotation of said pinion.

7. Apparatus according to claim 5 wherein said engagement arm is selectively coupled or decoupled with said pinion, whereby when coupled, movement of said engagement arm in a first direction effects in rotation of said pinion, and whereby movement of said engagement arm in a second direction does not effect rotation of said pinion.

8. A spot facing apparatus comprising:
   a mounting chuck for securing the apparatus relative to a bore;
   a housing rotationally fixed relative to said mounting chuck;

a spindle, said spindle being rotational relative to said chuck and housing;

a tool holder mounted to said spindle, wherein said tool holder is radially translatable relative to said spindle; and an incremental feed drive for incrementally translating said tool holder relative to said spindle.

9. A spot facing apparatus according to claim 8, wherein said incremental feed drive comprises:

a feed rack mounted to said tool holder; and a feed pinion engaged with said feed rack.

10. A spot facing apparatus according to claim 9, wherein said incremental feed drive further comprises a feed actuator connected to said feed pinion for rotating said feed pinion.

11. A spot facing apparatus according to claim 10, wherein said feed actuator comprises an arm member, said arm member being connected to said feed pinion via a shaft and a clutch, wherein movement of said feed arm in a first direction causes movement of said feed pinion, and movement of said feed arm in a second direction is not transmitted to said feed pinion.

12. A facing machine comprising:

a housing;

a rotational spindle mounted to said housing;

a tool holder mounted to and radially translatable relative to said rotational spindle;

a translation indexer for effecting radial translation of said tool holder; and a translation index adjustment member mounted to said housing, for altering the amount of radial translation effected by said translation indexer.

13. A facing machine according to claim 12, wherein said translation indexer comprises an arm member mounted to said rotational spindle, and a biasing member to bias said arm member towards a first direction, wherein said index adjustment member comprises a dog that is insertable into a travel path of said arm member for deflecting said arm member against the biasing member.

14. A facing machine according to claim 13 wherein said arm member is coupled to said tool holder, wherein deflection of said arm member by said dog is translated to radial movement of said tool holder.

15. A facing machine according to claim 14 wherein said arm member is coupled to said tool holder via a clutch, whereby movement of said arm member in other than a direction of deflection is not translated to radial movement of said tool holder.

16. A facing machine according to claim 12 further comprising:

a mandrel, said housing and said spindle being longitudinally translatable along said mandrel;

a feed screw, said feed screw being threadably engaged with said mandrel and fixedly but rotationally engaged with said housing and said spindle, whereby rotation of said feed screw effects translation of said housing and spindle longitudinally along said mandrel.

17. A facing machine according to claim 16, further comprising a mounting chuck and a draw bolt engaged with said mounting chuck, wherein said draw bolt is received within said mandrel.

18. A facing machine comprising:

a rotational tool support;

axial feed mechanism for axially translation said tool support;

radial feed mechanism for radially translating said tool support;

a radial feed rate adjustment mechanism, for altering the amount of radial translation effected by said radial feed mechanism;

wherein an adjustment control of said radial feed rate adjustment mechanism remains stationary during operation of said rotational tool support.

19. A facing machine according to claim 18, wherein said axial feed mechanism remains stationary during operation of said rotational tool support.

* * * * *